Figures 1, 2:

(No Model.)

L. H. LORCH.
MACHINE FOR SEPARATING OR SORTING FEATHERS.

No. 514,372. Patented Feb. 6, 1894.

WITNESSES:

INVENTOR

Ludwig Hermann Lorch

BY

ATTORNEYS

UNITED STATES PATENT OFFICE.

LUDWIG HERMANN LORCH, OF CANNSTADT, GERMANY.

MACHINE FOR SEPARATING OR SORTING FEATHERS.

SPECIFICATION forming part of Letters Patent No. 514,372, dated February 6, 1894.

Application filed June 22, 1893. Serial No. 478,547. (No model.)

*To all whom it may concern:*

Be it known that I, LUDWIG HERMANN LORCH, a subject of the King of Würtemberg, residing at Cannstadt, Würtemberg, Germany, have invented certain new and useful Improvements in Machines for Separating or Sorting Feathers, of which the following is a specification.

It is the object of my invention to provide an apparatus for separating or sorting feathers and like material in which a current of air will be directed vertically into the feathers to elevate them to different heights according as they differ in weight and blow them out of the wind trunk through valved openings disposed at different heights.

In the drawings:—Figure 1, is a central vertical section of the machine with the driving connections shown in dotted lines as also the regulating mechanism for the air valves. Fig. 2, is a longitudinal vertical section through the trunk and wind trough on line $x—x$ of Fig. 1 showing the deflector and the perforated board therein. This view also shows the driving connections on the right in elevation.

The casing comprises the cylindrical portion A and the upwardly tapered extension $b'$. The feathers or other material to be sorted are placed in the cylindrical chamber through the hinged door $q$ in its front side and are subjected to the action of the stirrers or beaters on the shaft $c$ which may be driven from a shaft 1 through belt and pulleys 2, 3, 4, or by hand from a crank 5. The mass of material as it is stirred is subjected to a blast of air entering through the series of openings $e$, extending longitudinally of the bottom of chamber A from end to end. As the material is thus forced up it is further separated by the upper beaters arranged on shaft $c'$ at the base of the contracted part of the upper trunk or casing. The lighter feathers are carried up by the blast of air and discharged through the upper valve opening $o^3$ which is controlled by the valve 6. The other feathers are discharged through the lower valve openings $o'$ $o^2$ according to their weight each opening being controlled by a suitable valve.

The air openings in the bottom of chamber A are controlled by a perforated slide $d$, which has a handle at one end by which it may be operated to vary the size of the air opening.

The upper stirrer shaft is operated from the lower through the belt 7 and pulleys 8, 9. The air is supplied to the casing from a blower arranged centrally below and slightly toward the rear of the same. The blower casing 10, has lateral air inlets $n'$, $n^2$ and the air entering through these is blown forward by the fan 11 through the delivery spout 12 up into the wind trough 13, which comprises the chambers $f$ and $g$ separated by the perforated partition $h$, the chamber $g$ being below the perforated bottom of the chamber A and communicating with said chamber through the perforations. The incline plate 14 which extends from the lower part of the chamber A to the lower front beam of the frame forms the front wall of the chamber $f$ of the wind box. In order to distribute the air toward the ends of the wind box chamber $f$, a deflector $l$ is arranged directly over the opening in the bottom of the said chamber $f$ through which the blast of air rises. This deflector comprises laterally curved plates which direct the air toward the ends of the wind box. From the chamber $f$ the blast passes through the perforations $i$ of the partition $h$ being divided and distributed thereby and from the chamber $g$ the air rises equally into the chamber A throughout the extent of the same. The blower fan shaft 15 is driven from the shaft 1 by the belt and pulleys 16, 17 and 18. The blower casing has a hinged door $k$, through which access may be had to the interior of the casing. The air inlets $n'$, $n^2$ are controlled by disk valves 20, 21 carried by arms $m'$, $m^2$ on the shaft 22 the end of which is connected by a crank arm 23 with a screw shaft 24, journaled in a bearing 25, and operated by a hand wheel 26, a set nut 27 being provided to hold the parts when once adjusted.

The general supporting frame may be of any ordinary construction, such as is shown and suitable bearings are provided for the various shafts. The chamber A has also a hinged lower door at $r$, through which any residue of waste material may be taken out. The feathers are discharged into a casing P in rear of the chambers A and $b'$ where they fall in proper layers according to their weight.

A screen $26^\times$ is provided in the casing P to prevent the escape of the sorted feathers. Suitable glasses or windows may be provided at 25 by which the action of the apparatus may be observed.

I claim as my invention—

1. In combination, the casing comprising the upper tapered part $b'$, having openings at different heights, the enlarged chamber A at the lower end of the tapered part, the blower and the wind trunk intermediate thereof and the enlarged chamber A, said chamber having a series of perforations throughout its bottom, to receive air from the wind trunk, substantially as described.

2. In combination, the casing comprising the feather chamber A having the perforated bottom, the upper tapered extension $b'$ thereof having the valved openings at different heights therein, the blower and the stirrer mechanism comprising the main stirrer in the chamber A and the supplemental stirrer above the same at the base of the tapered portion $b'$, substantially as described.

3. In combination, the casing comprising the chamber for the feathers having a perforated bottom, the wind trough extending under the same and comprising the chambers $f$ and $g$ separated by the perforated partition $h$, the blower and the deflector $l$ arranged midway of the chamber $f$ to deflect the air currents laterally, substantially as described.

4. In combination, the casing comprising the casing with the chamber A for the feathers, the wind trunk and the blower comprising the fan and fan casing having the inlets $n'$, $n^2$, the disk valves, the arms carrying the same secured to the shaft and the screw shaft for adjusting the position of the valves, substantially as described.

In witness whereof I have hereunto set my hand in presence of two witnesses.

LUDWIG HERMANN LORCH.

Witnesses:
HUGO L. BEIL,
E. SCOTT.